INVENTORS
JAMES J. CHISHOLM
ALEXANDER E. MARTENS

United States Patent Office 3,411,006
Patented Nov. 12, 1968

3,411,006
GAIN CONTROL SYSTEM COMPRISING
TWO MOTORS
James J. Chisholm, Rochester, and Alexander E. Martens, Greece, N.Y., assignors to Bausch & Lomb Incorporated, Rochester, N.Y., a corporation of New York
Filed Feb. 14, 1966, Ser. No. 527,233
12 Claims. (Cl. 250—214)

This invention relates to control systems in general and more particularly to control systems for calibrating test equipment.

A standard method of making accurate scientific measurements with precision testing apparatus is to calibrate the equipment with a standard known quantity to which the unknown is to be compared. Once the testing apparatus is calibrated, the unknown is substituted for the standard so that the unknown is exposed to the same testing conditions and sensing apparatus as the standard to provide a direct comparison with the standard. The calibration is generally done immediately before the measurement to eliminate errors due to changes in the operating conditions of the test equipment such as to component drift, temperature, etc.

In cases where a large number of unknowns are to be tested, it is advantageous to include means for automatically calibrating the apparatus prior to testing a sample or a group of samples in sequence to reduce the possibility that the operator may forget to calibrate the equipment, or may incorrectly calibrate the apparatus. In addition, with automatic calibration the test equipment can be operated by less skilled personnel and still obtain a high degree of accuracy.

In single beam spectrophotometers, for example, unknown and standard samples are exposed to the same beam of monochromatic radiation (essentially a limited band of wavelengths) and the response thereto is detected by a radiation sensitive device to develop electrical signals that relate to the transmission absorption or reflection characteristics of the samples. The electrical signals are processed to provide an accurate visual indication of the response of the sample to the radiation. In such equipment the testing conditions change according to the wavelength at which the sample is tested and also with the operating conditions the test equipment is exposed to, such as temperature, etc. For example, the output energy level of a source of monochromatic radiation varies irregularly with wavelength due to wide variations in the spectral content of lamps, the spectral transmission efficiency of monochromators and filters, etc. Furthermore, the response of a radiation sensitive device, such as a photomultiplier, changes with the wavelength applied thereto and also with time and temperature. As a result, the gain of the test apparatus is continually changing with the above variations in testing conditions. In order to make precise measurements, the gain of the system must be calibrated each time the wavelength is changed and also periodically to compensate for changes in sensitivity due to temperature, etc.

In order to effectively calibrate an instrument, such as a single beam spectrophotometer, means must be provided for adjusting the gain of the system over a wide range of variables to effectively compensate for the possible extremes in testing conditions and also to include means for accurately setting the gain of the system to the required value. Furthermore, to eliminate problems due to operator error the system should be readily adaptable to means for automatically calibrating the system. Such automatic calibration means should be moderately priced in order to compete with manually operated systems and provide the added advantages at an economically feasible price.

It is therefore an object of this invention to provide a new and improved control system.

It is also an object of this invention to provide a new and improved control system that is adapted to automatically calibrate test equipment.

It is still a further object of this invention to provide a new and improved control system for the calibration of test equipment that also provides visual indication of the test results.

It is also an object of this invention to provide a new and improved control system for test equipment including means for accurately adjusting the gain of the system for operation with a large range of signal input amplitudes.

A control system embodying the invention includes a signal translating circuit adapted to be gain controlled and a gain control circuit coupled to the signal translating circuit for controlling the gain thereof. The gain control circuit includes a first and a second variable impedance means, such as potentiometers, for determining the gain of the signal translating circuit. The first variable impedance means functions as a coarse control while the second functions as a fine control. A first and second motor means are coupled to drive the first and second variable impedance means in a controlled manner to control the gain in the signal control circuit.

A detection means, such as limit switches, are coupled to the second variable impedance means to provide a control signal when the second variable impedance means is varied to preset limits. The control signal actuates the first motor means to drive the first variable impedance means. Circuit means couple the output circuit of the signal translating channel to the second motor means so that the first and second motor means cooperate to control the gain of the signal translating channel in a manner that the amplitude of the signal from said output circuit is adjusted to a substantially constant value for wide range of signals applied to said input circuit. Switching means are coupled to said second motor means to render the second motor means inoperative after the first and second motor means cooperate to set the gain of the signal translating circuit in response to a standard signal applied to the signal translating stage input circuit.

A further feature of the invention includes a third motor means coupled to be energized when the first and second motor means are rendered inoperative. The third motor means is coupled to drive a visual indicator, such as a digital readout, to provide an accurate reading of an amplitude of a test signal applied to the input circuit in comparison to the amplitude of the standard signal.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

Figure 1:
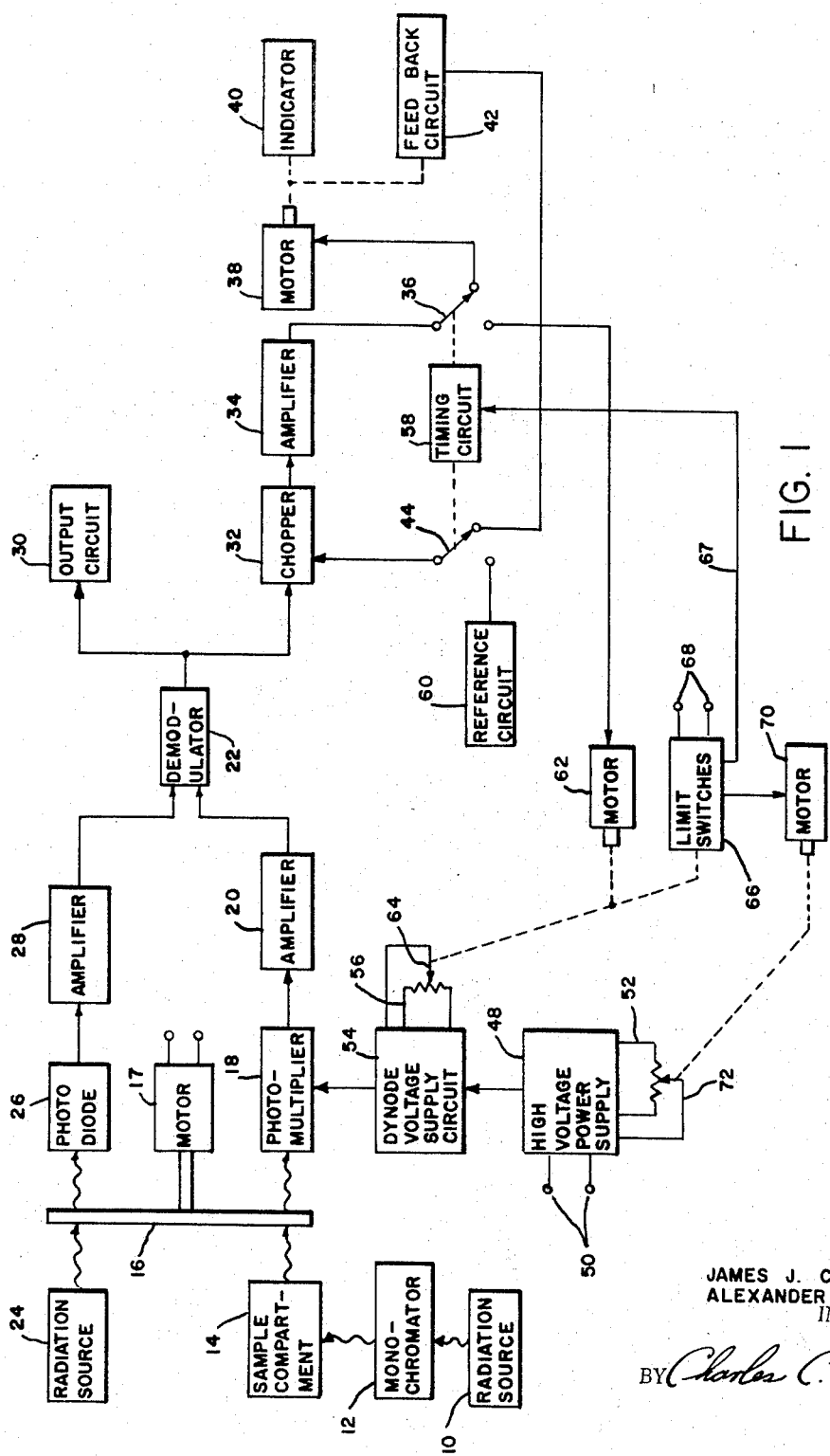
FIGURE 1 is a block diagram of a single beam spectrophotometer embodying the control system of the invention.

In the spectrophotometer of FIGURE 1, a source of radiation 10 provides the radiant flux for a monochromator 12. The monochromator 12 is adapted to variably disperse the radiant flux and to direct a monochromatic output radiation (a limited band of wavelengths) at a sample compartment 14. The sample compartment 14 is adapted to receive known reference and unknown test samples of which the ratio of transmittance, absorbance or reflectance are to be compared.

The radiant flux is passed through the sample compartment, chopped by a rotating disk 16 driven at a constant speed by a motor 17 and applied to a photomultiplier tube 18. The photomultiplier tube 18 generates electrical signals in response to the radiant flux received. The amplitude of electrical signals generated by the photomultiplier tube 18 is a function of the intensity of the pulses of radiant flux received. The electrical signals are amplified by an amplifier circuit 20 and applied to a demodulator circuit 22. A second source of radiation 24 directs radiant flux to another portion of the chopper disk 16. The chopped radiant flux is received by a photo diode 26 which generates reference demodulator signals. The reference demodulator signals are amplified by an amplifier circuit 28 and applied to the demodulator 22.

The demodulator circuit 22 converts the signals generated by the photomultiplier tube 18 to a direct current signal that is proportional to the intensity of the radiant flux received by the photomultiplier tube 18. The direct current signal is coupled to an output circuit, which may, for example, include a direct current meter to provide a visual indication of the intensity of the radiant flux received by the photomultiplier tube 18.

The direct current signal is also applied to a digital readout system to provide an accurate indication of the intensity of light beam received by the photomultiplier tube. The digital readout system includes a chopper circuit 32 coupled to receive the direct current signals from the demodulator 22 and compares them with feedback signals and applies a chopped difference current signals to an amplifier circuit 34. The amplified difference signals are coupled through a switching means 36 to a servo motor 38. The shaft of the servo motor 38 is coupled to drive a digital readout indicator 40. A feedback circuit 42, by way of example can include a source of reference potential and a potentiometer, is also coupled to the shaft of the motor 38 to generate feedback signals that are a function of the indication provided by the digital readout 40. The output of the feedback circuit 42 is coupled back through a switching means 44 to the chopper circuit 32. In operation the digital readout indicator will be driven until the feedback voltage substantially equals that of the direct current demodulated signal thereby providing an accurate indication of the transmission, absorption or reflection characteristics of the material in the sample compartment 14.

Automatic calibration means are provided for calibrating the spectrophotometer of FIGURE 1 with a known reference sample thereby conditioning the apparatus for accurately comparing the transmission, absorption or reflection characteristics of a test sample with that of a known reference sample. The spectrophotometer is calibrated by controlling the magnitude of the energizing potential applied to the photomultiplier 18 while the known reference sample is in the sample compartment 14. The energizing potential for the photomultiplier 18 is developed by a power supply circuit 48 including a pair of terminals 50 adapted to be connected to the line voltage. The power supply 48 includes a potentiometer 52 for controlling the magnitude of the voltage developed by the power supply. The output voltage from the power supply 48 is coupled to the photomultiplier 18 through a dynode voltage supply circuit 54. A voltage is picked off from the dynode voltage supply circuit 54 by a potentiometer 56 and applied to at least one of the photomultiplier dynodes to control the operating conditions of the photomultiplier.

In effect, the potentiometer 52 provides a coarse-control means for controlling the voltage applied to the photomultiplier while the potentiometer 56 is a fine-control means. Such fine-coarse gain control system is essential to effectively calibrate the spectrophotometer for the large range of testing conditions as the testing wavelength is changed. For example, the intensity of the source of radiation, the transmission efficiency of the monochromator, the transmission and reflection properties of the optical elements, and the sensitivity of the photomultiplier all vary considerably with wavelength. Furthermore, the band width of the beam of radiation applied to the sample compartment is normally controlled by changing the slit width of the monochromator. Any change in the slit width of the monochromatic correspondingly changes the output of the monochromator as a proportional function of the slit width. Under such widely and irregularly varying conditions it is difficult, if not impractical, to obtain the required range of gain control as well as the required accuracy with a single potentiometer.

When a reference sample is moved into the measuring position in the sample compartment 14, a switching means 36 and 44 are switched into their second operating position by a timing circuit 58. The switching means 44 is actuated to remove the feedback circuit from the chopper circuit 32 and apply a reference signal to the chopper from a reference circuit 60. The switching means 36 is actuated to couple the output circuit of the amplifier circuit 34 to a second servo motor 62. The motor 62 is coupled to drive the movable arm 64 of the fine control potentiometer 56.

A pair of limit switches 66 are also coupled to the potentiometer arm 64. A limit switch is actuated when the potentiometer arm 64 has reached one of its limits of travel. The limit switches 66 are coupled to a source of energizing potential such as the line voltage through a pair of terminals 68 and, when actuated, apply the voltage to a motor 70. The motor 70 is coupled to the movable arm 72 of the coarse control potentiometer 52.

In operation, when a reference sample is placed in a sample compartment 14 the timing circuit 58 is energized, the switching means 36 and 44 connect the reference circuit 60 and the motor 62 into the system. The direct current signal developed by the demodulator, corresponding to the transmission, absorption or reflection characteristics of the reference sample is compared by the chopper 32 with the reference voltage to provide a difference signal. The difference signal is amplified by the amplifier 34 and applied through the switching means 36 to drive the motor 62. The motor 62 will adjust the fine control potentiometer 56 in a direction to reduce the difference signal developed by the chopper 32.

If the signal generated by the photomultiplier tube 18 in response to the radiation applied thereto approaches that of the desired calibration value, the difference signal will be small and the gain of the photomultiplier tube 18 adjusted by the fine control potentiometer 56. On the other hand signal generated by the photomultiplier tube 18 is much greater than covered by the range of the fine control potentiometer 64, the motor 62 will drive the potentiometer arm 64 until a limit switch 66 is actuated. The actuated limit switch will apply a driving voltage to the motor 70 so that the motor 70 adjusts the potentiometer 52 in a direction to cooperate to calibrate the gain of the photomultiplier tube 18. As the motor 70 approaches the desired setting, the limit switches 66 will open and the fine control potentiometer 56 will be positioned for the final setting. The timing circuit 58 is coupled to the limit switches 66 (line 67) so that the timing sequence of the timing circuit 58 does not run until the coarse control potentiometer 52 is adjusted to a point wherein the fine-control potentiometer arm 64 is driven from a limit position. When the limit switches are de-actuated, the timing cycle of the timing circuit 58 begins to run, keeping the circuit in the actuated position for calibration for a period of time sufficient to allow the motor 62 to finally precalibrate the system. After the predetermined time (timing cycle) has expired, the timing circuit 58 deactuates the switching means 36 and 44 to the position as shown to allow the digital readout system to operate. The spectrophotometer is now calibrated to accept a test sample and provide an accurate comparison of the transmission, absorption or reflection characteristics of the test sample to that of the known reference sample.

Figure 2:
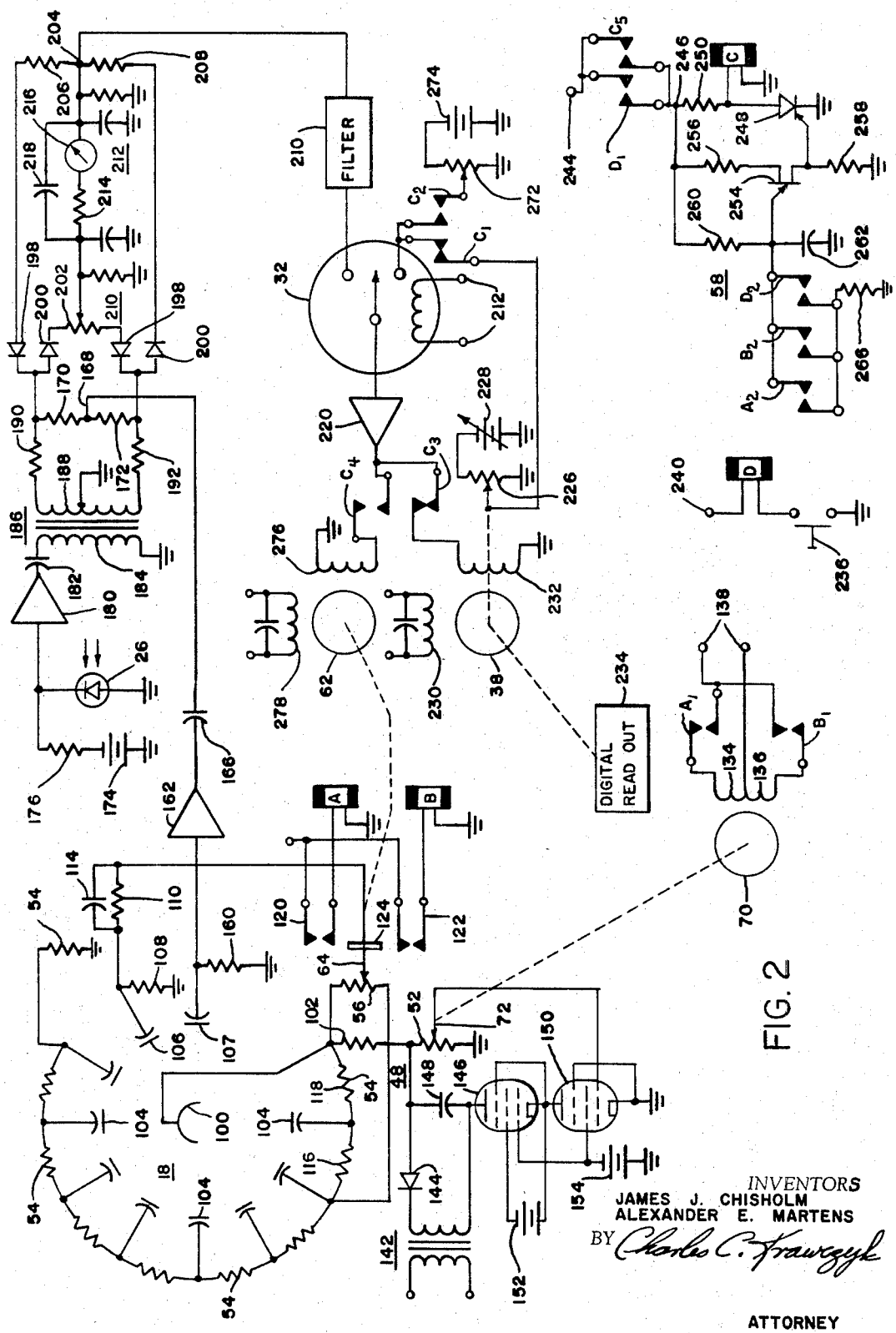
FIGURE 2 is a schematic diagram of the electrical portion of the spectrophotometer of FIGURE 1.

Referring now to the schematic diagram of FIGURE 2, the photomultiplier tube 18 is connected to generate electrical signals in response to a beam of radiation impinging on a radiation sensitive photocathode 100. The photocathode 100 is connected to the high voltage power supply 48 through a resistor 102 while the plurality of photomultiplier tube dynodes 104, except the last dynode 106, are connected to consecutive portions of the dynode voltage supply circuit 54 connected between the resistor 102 and ground. The last dynode 106 is coupled to a voltage divider including the series resistors 108 and 110 connected between the movable arm 64 of the fine control potentiometer 56 and ground. A capacitor 114 is connected across the resistor 110. The potentiometer 56 is connected across the resistors 116 and 118 of the voltage divider 54.

A pair of limit switches 120 and 122 are mounted along the path of the movable arm 64 for actuation by an insulator 124 when the arm 64 has reached its limit of travel. The limit contacts 120 and 122 are connected to actuate the relays A and B respectively. The relay contacts corresponding to the relays of FIGURE 2 are designated by the same letter designation applied to the relay followed by a number designating a particular pair of contacts in that relay. The normally open contacts A and B of the relays $A_1$ and $B_1$ repectively are connected in series with the motor 70 field windings 134 and 136 respectively to apply power from a pair of terminals 138 (adapted to be connected to a 60 cycle source of energization). The motor 70 is a shaded pole motor adapted to rotate in opposite directions depending upon the field winding energized. The armature of the motor 70 is coupled to drive the movable arm 72 of the coarse-control potentiometer 52.

The coarse-control potentiometer 52 is connected in shunt with the power supply 48 to control the magnitude of the voltage developed by the power supply 48. The power supply 48 includes a transformer 142 including a primary winding adapted to be connected to the line voltage, and a secondary winding, one end of which is connected through a rectifying diode 144 to the junction of the potentiometer 52 and the resistor 102, and the other end to the palte electrode of a regulator tube 146. A filter capacitor 148 is connected between the anode of the diode 144 and the plate electrode.

The regulator circuit includes two tubes 146 and 150 connected in series between the secondary winding of the transformer 142 and ground. In each of the tubes 146 and 150, the suppressor grid is connected to the cathode, while the screen grid is connected to a source of biasing potential 152 and 154 respectively. The control grid of the tube 146 is also connected to the source of biasing potential 152. The movable arm 72 of the potentiometer 52 is coupled to the control grid of the tube 150 to control the conduction of the tubes 146 and 150 thereby controlling the magnitude of the voltage developed by the power supply 48.

The anode 107 of the photomultiplier tube is connected to ground through a resistor 160 and to the input circuit of an amplifier circuit 162. The amplitude of the signals generated at the anode 107 is directly related of the intensity of the radiation impinging on the radiation sensitive cathode 100 and the magnitude of the energizing voltage applied to the photomultiplier 18 dynodes. By decreasing the energizing potential applied to the photomultiplier and dynode 107 the gain of the photomultiplier is decreased and vice versa. Electrical signals generated by the photomultiplier tube 18 are amplified by the amplifier 162 and are coupled through a capacitor 166 to a common junction 168 of the series demodulator resistors 170 and 172.

Referene pulses are generated by the radiation sensitive diode 26 connected to a source of energizing potential 174 (illustrated as a battery) through a resistor 176. The reference pulses developed by the photo diode 26 are coupled to an amplifier 100. Amplified reference signals are coupled through a capacitor 182 to a primary winding 184 of a demodulator transformer 186. The center tap of the secondary winding 188 is connected to ground while the ends of the secondary winding are connected through current limiter resistors 190 and 192 to a rectifying circuit. The ends of the series resistors 170 and 172, other than connected to the common junction 168 are also connected to the rectifying circuits.

Each rectifying circuit includes two diodes 198 and 200. The diodes 198 and 200 act act as rectifiers to provide a full wave demodulated signal between the movable arm of a potentiometer 202 and a common junction 204 of the series resistors 206 and 208, that is proportional to the amplitude of the electrical signals generated at the photomultiplier anode 107. The demodulated signals are filtered by the R-C (resistance-capacitance) filter circuits 210 and 212 and are applied through a current limiting resistor 214 to a direct current meter 216. A capacitor 218 is connected across the meter 216 and the resistor 214. The meter 216 provides an average reading of the amplitude of the signals generated by the photomultiplier tube 18 thereby providing an indication of the transmission, absorption or reflectance characteristics of the sample in the sample compartment 14.

The demodulated signals developed at the junction 204 are also coupled through a filter circuit 210 to an input contact of the chopper 32. The other input contact of the chopper 32 is connected to the normally closed relay contact $C_1$ and the normally open relay contact $C_2$ of a relay C. The chopper 32 is adapted to be energized by applying the 60 cycle voltage across the terminals 212. The chopper 32 alternately switches between the two input terminals to provide a 60 cycle alternating difference signal (difference between the signals applied to the two input terminals) to an amplifier 220. The output of the amplifier circuit 220 is coupled to a normally closed relay contact $C_3$ and a normally open contact $C_4$ of the relay C. All relay contacts in FIGURE 2 are illustrated in the de-energized position for normal testing operation.

With the relay C de-energized, a feedback signal generated by a potentiometer 226, energized by a source of variable energizing potential 228 (illustrated as a battery) is applied through the relay contact $C_1$ to the chopper 32. The movable arm of the potentiometer 226 is coupled to move with rotation of the rotor of the motor 38. The motor 38 in the present embodiment is a two phase motor wherein a first field 230 is energized to a 60 cycle potential, while a driving signal applied across the second field 232. The chopper 32 chops the feedback signal and the demodulated signal applied thereto to provide a difference signal which is amplified by the amplifier 220 and applied through a relay contact $C_3$ to the field 232 so that the motor 38 rotates a digital readout 234. The servo loop will be nulled when the feedback signal is substantially equal to the demodulated signal. The digital readout 234 provides an accurate reading of the amplitude of the demodulated voltage applied to the chopper 32 and thereby also provides a reading of the transmission, absorption or reflection characteristics of the sample.

The spectrophotometer of FIGURES 1 and 2 is calibrated by moving a known reference sample into the measuring position in the sample compartment and momentarily depressing a calibration push button 236 connected in series with a relay D between a supply terminal 240 (adapted to be connected to a source of energizing potential) and ground, thereby energizing the relay D. Upon energization a normally open contact $D_1$ of the relay D applies power to a common junction 246 of the timing circuit 58 from a supply terminal 244 (adapted to be connected to a source of energizing potential). Although the timing circuit 58 is energized, the timing cycle does not commence while the potentiometer movable arm 64 actuates any of the limit switches as fully explained in a later portion of the specification.

The relay C is connected across a controlled rectifier 248 and in series with a resistor 250. When the relay contact $D_1$ is initially closed, the controlled rectifier 248 is not conducting and the relay C is energized through the resistor 250. A normally open relay contact $C_5$ of the relay C is connected in shunt with the relay contact $D_1$ to keep the timing circuit 58 energized after the push button 236 is released. The energization of the relay closes the contact $C_2$ and $C_4$ and opens the contacts $C_1$ and $C_3$, thereby conditioning the spectrophotometer for automatic calibration.

The relay C remains energized until the controlled rectifier 248 is rendered conductive and effectively bypasses the relay C, thereby de-energizing the relay. The period during which the relay C is energized is more than sufficient to provide for the automatic calibration of the system.

The controlled rectifier 248 is rendered conductive by a triggering circuit including a uni-junction transistor 254. The bases of the uni-junction transistor 254 are connected in series with the resistors 256 and 258 between the junction 246 and ground. A series R-C circuit including a resistor 260 and a capacitor 262 are connected between the junction 246 and ground. The voltage developed across the capacitor 262 is applied to the emitter electrode of the uni-junction transistor 254 wherein the transistor develops a firing pulse across the resistor 258 when the voltage has reached a predetermined level. The firing pulse is applied to the controlled rectifier 248 gate electrode to render it conductive, de-energizing the relay $C_1$, opening the relay contact $C_5$ and inactivating the timing circuit 58 until the calibrate push button 236 is closed for another calibration cycle. The time duration during which the relay C is energized is determined by the R-C time constant required to charge the capacitor 262 to a value so that the uni-junction 254 develops the firing pulse.

When the push button 236 is closed, a second normally open contact $D_2$ of the relay D is closed to connect a resistor 266 across the capacitor 262. The value of the resistor 266 is selected so that, when connected in the circuit, then capacitor 262 does not charge to the voltage required to create a firing pulse. The controlled rectifier will not conduct as long as the push button 236 is depressed. In addition, two normally open relay contacts $A_2$ and $B_2$ of the relays A and B respectively are connected in shunt with the relay contact $D_2$ so that the control rectifier 248 will not be rendered conductive while either the limit switches 120 and 124 are closed and the timing cycle of the circuit can not start while the movable arm 64 is in a limit position actuating either limit switch 120 or 122.

When the relay C is energized the relay contact $C_1$ opens removing the feedback signal from the chopper while the relay contact $C_2$ is closed to apply a reference calibration voltage developed by a potentiometer 272 connected in parallel across the source of energizing potential 274 (illustrated as a battery). In addition, the relay contact $C_3$ opens to disconnect the field 232 of the motor 38 and the relay contact $C_4$ closes to connect the field 276 of a motor 62 to the amplifier 220. The motor 62 is a two phase motor including a reference winding 278 adapted to be connected to a 60 cycle source of potential. The motor 62 is coupled to drive the movable arm 64 of the fine-control potentiometer 56. As the arm 64 is moved the voltage applied to the dynode 108 is changed thereby changing the gain of the photomultiplier tube 18.

If the movable arm 64 of the fine-control potentiometer 56 is in a limit position and the relay C is energized, the timing cycle of the timing circuit 58 does not start until the motor 70 drives the coarse-control potentiometer 52 in a direction to minimize the difference signal between the demodulated signal applied to the chopper 32 and the signal developed by the potentiometer 272. When the difference signal is reduced to the range of control of the fine-control potentiometer 56, the motor 62 drives the movable arm 64 away from the limit position in a direction to further reduce the difference signal. When the movable arm 64 travels sufficiently to allow the limit switch to return to its normally open position, the coarse-control motor 70 is de-energized and the timing cycle of the timing circuit commences for a period of sufficient duration to allow the difference signal to be nulled. When the difference signal is nulled, the gain of the photomultiplier tube 18 is preset to a desired value for the particular known reference sample used and the wavelength at which the test is conducted.

When the relay C is subsequently de-energized, the digital readout motor 38 and the feedback potentiometer 226 are connected into the system (contacts $C_1$ and $C_3$ closed) to provide a digital reading of the radiation characteristics of the reference sample. At this time the potentiometer 202 is adjusted to provide the desired meter 216 reading and the variable power supply 228 adjusted to provide a corresponding digital readout. For example, if liquid samples are to be tested in the ultraviolet and visible spectral regions, distilled water is normally used as the reference sample. The percentage of radiation transmitted by the distilled water reference sample can be assumed to be 100% and the system adjusted accordingly to provide a 100% reading at the meter 216 and the digital readout 234. The spectrophotometer is now in a position to receive test samples in the sample compartment 14 and providing reading of the radiation characteristics of the test sample in a direct comparison to those of the known reference sample.

It is important to note that with the widely and irregularly varying testing conditions (as previously set forth) it would be difficult, if not impractical, to obtain the required range of gain control, as well as the required accuracy and response time as achieved by the fine-coarse gain control system including the invention by a single gain control potentiometer system. For example, if a single potentiometer system included the potentiometer 56, the range of gain control would be highly limited. On the other hand if the single potentiometer system included the potentiometer 52 as part of a feedback control linear servo sysetm, it would be difficult to achieve the response time of the fine-coarse control system of the invention. The non-linearities and time constants of the power supply circuit 48 (including active elements such as the tubes 146 and 150) when introduced into a feedback system limit the stable response time that can be achieved. Furthermore, the resolution of the single potentiometer would limit the accuracy by which the system gain can be controlled.

As previously explained, the coarse-control potentiometer 52 of the invention is driven by an on-off relay-controlled single speed motor. This non-linear type of control system provides a stable and rapidly responding means for covering a wide range of gain control adjustments. The fine adjustment of the gain control system is accomplished by controlling the voltage applied to the last dynode 106 by fine control potentiometer 56. None of the non-linearities and time lags of the power supply circuit 48 are a portion of the fine-control servomechanism feedback loop so it is possible to have a rapidly responding fine control system without any serious instability problems.

Furthermore, it should be noted that both ends of the fine control potentiometer 56 are connected to potential above ground. As a result, the voltage at the dynode 106 cannot be reduced to a value to effectively cut off the photomultiplier tube 18 as would be experienced by potentiometers connected between a source of voltage and ground.

It should also be noted, the automatic calibrating control system employs a number of components in common with those employed with the digital readout. As a result the additional cost of adding automatic calibration, to a spectrophotometer employing a digital readout is minimized thereby making the automatic calibration system economically desirable.

In addition, where a group of samples are to be tested with respect to a common reference sample, means can be included for momentarily energizing the relay D when the reference sample is inserted into the sample compartment 14 for calibration, and then provide for the testing of the group of samples in consecutive order.

We claim:
1. A control system comprising:
   a signal translating circuit adapted to be gain controlled including an input circuit and an output circuit;
   a gain control circuit coupled to said signal translating circuit for controlling the gain thereof, said gain control circuit including first and second variable impedance means for determining the gain of said signal translating circuit;
   detection means coupled to said first variable impedance means for developing a control voltage when said first variable impedance means is varied to preset limits;
   first motor means coupled to drive said second variable impedance means;
   first circuit means coupling said detection means to said first motor means for applying said control voltage to drive said first motor means in a predetermined direction;
   second motor means coupled to drive said first variable impedance means;
   second circuit means coupling said output circuit of said signal translating circuit to said second motor means so that said first and second motor means cooperate to control the gain of said signal translating circuit so that the amplitude of the signal at said output circuit is adjusted to a substantially constant value for variable signal amplitude applied to said input circuit.

2. A control system as defined in claim 1 including:
   switching means coupled to said second motor means to render said second motor means inoperative after said first and second motor means cooperate to set the gain of said signal translating circuit in response to a standard signal applied to said input circuit and
   output circuit means coupled to said signal translating circuit for developing output signals that are a function of the amplitude of the standard and test signals applied to said input circuit.

3. A control system as defined in claim 1 wherein:
   said signal translating stage includes a radiation sensitive device for generating electrical signals in response to radiation signals applied thereto, said reduction sensitive device being adapted to be gain controlled by controlling the magnitude of a supply voltage applied thereto and
   said gain control circuit comprises a variable power supply circuit wherein said first variable impedance means comprises a potentiometer coupled to said power supply circuit to control the magnitude of the voltage developed by said power supply circuit and wherein said second variable impedance means comprises a potentiometer coupling said power supply circuit to a portion of said radiation sensitive device.

4. The combination comprising:
   a radiation sensitive device for generating electrical signals in response to radiation signals applied thereto, the amplitude of said electrical signals being a function of the intensity of the radiant flux received by said radiation sensitive device and wherein said radiation sensitive device being adapted to be gain controlled by controlling the magnitude of a supply voltage applied thereto;
   means for applying a reference beam of radiation on said radiation sensitive device for calibrating the gain thereof, and for applying test beams of radiation for measuring the intensity of said test beam for comparison with said reference beam;
   a power supply circuit;
   a first potentiometer, including a movable arm, coupled to said power supply circuit for controlling the magnitude of the voltage developed by said power supply voltage;
   first circuit means, including a second potentiometer having a movable arm coupling said power supply circuit to said radiation sensitive device;
   a pair of limit switches coupled to said movable arm of said one of said first and second potentiometer adapted to be actuated when said arm reaches preset limits of movement;
   first motor means coupled to said movable arm of said first potentiometer for positioning said potentiometer;
   second motor means coupled to said movable arm of said second potentiometer for positioning said potentiometer;
   second circuit means coupling said pair of limit switches to one of said first and second motors for applying power to said motor during the actuation of one of said limit switches;
   means for developing a standard signal;
   third circuit means for comparing the electrical signals generated by said radiation sensitive device in response to said reference beam with said standard signal and for developing a difference signal, and for applying said difference signal to one of said first and second motors other than that coupled to said limit switches for applying said difference signal for driving said motor in a direction to reduce the amplitude of said difference signal whereby said first and second motors cooperate to calibrate the gain of said radiation sensitive device, and
   a switching circuit coupled to said third circuit means for rendering said first and second motors inoperative after the gain of said radiation sensitive device is calibrated.

5. The combination as defined in claim 4:
   wherein said switching circuit disconnects said means for developing a standard signal from said first circuit means when said first and second motor means are rendered inoperative;
   a third motor coupled to drive an indicator means;
   fourth circuit means coupling said third circuit means to said third motor through said switching circuit for applying a driving signal thereto when said first and second motor is rendered inoperative;
   feedback means coupled between said third motor and third circuit means through said switching circuit for applying a feedback voltage to said second circuit means when said first and second motors are rendered inoperative so that said third motor drives said visual indicator means to provide an indication that is proportional to the intensity of said reference and test beams.

6. In a photometer including a photomultiplier tube having a photocathode, an anode and plurality of dynodes, means for applying reference and test beams of radiation to said photomultiplier tube photocathode and a power supply circuit for energizing said photomultiplier tube, the calibration system comprising:
   first circuit means including a first potentiometer coupled to said power supply circuit for controlling the magnitude of the voltage developed by said power supply circuit;

second circuit means coupling said power supply circuit to said photomultiplier tube photocathode and to selected ones of said photomultiplier tube dynodes;

third circuit means including a second potentiometer coupled between said second circuit means and at least one photomultiplier dynode for controlling the voltage applied to said dynode whereby said first and second potentiometers calibrate the photometer by controlling the gain of said photomultiplier tube by determining the magnitude of voltage applied to said photomultiplier tube anode and dynodes;

first and second motor means coupled to drive said first and second potentiometers respectively;

fourth circuit means including a source of reference signals coupled between said photomultiplier tube anode and said second motor means for completing a feedback loop for positioning said second potentiometer to control the gain of said photomultiplier tube in accordance with the amplitude of said reference signals and the intensity of said reference beam of radiation;

fifth circuit means coupled between said second potentiometer and said first motor means for detecting when said second potentiometer has been positioned beyond a predetermined range of travel and for energizing said first motor means when said range is exceeded to position said first potentiometer in a direction so that said first and second potentiometers cooperate to control the gain of said photomultiplier tube in a manner to calibrate the photometer.

7. The calibration system as defined in claim 6 wherein said fifth circuit means includes:

first and second limit switches for actuation thereof when said second potentiometer is positioned beyond first and second points of travel defining said predetermined range of travel;

sixth circuit means coupling said first and second limit switches to said first motor means for energizing said first motor means when said second potentiometer is positioned to actuate one of said first and second limit switches wherein said first motor means drives said first potentiometer in a direction to cause said second motor means to drive said second potentiometer in a direction to deactuate said limit switch.

8. The calibration system as defined in claim 7 including:

a third motor means coupled to drive an indicator means;

feedback means coupled to said indicator means to provide a feedback signal corresponding to the position of said indicator means, and wherein said fourth circuit means includes a switching means for disconnecting said second motor means and said source of reference potential when the photometer is calibrated and for connecting said third motor means and said feedback means to said fourth circuit means so that said indicator means provides a reading corresponding to the intensity of radiation applied to said photocathode.

9. The calibration system as defined in claim 8 wherein said switching circuit includes a timing circuit that provides a predetermined control period while second potentiometer is within said predetermined range of travel, said control period being of sufficient time duration for said second motor to position said second potentiometer, said timing circuit being connected to actuate said switching circuit after said predetermined control period is exceeded to disconnect said second motor means and source of reference signals from said fourth means and connect said third motor means and said feedback means.

10. A calibration system for a spectrophotometer including a photomultiplier tube having a plurality of dynodes and adapted to receive reference and test beams of radiation, a power supply for energizing the photomultiplier tube, and circuit means for processing the electrical signal generated by said photomultiplier tube in response to said reference and test beams of radiation to produce a signal that is a function of the intensity of the beam of radiation applied to said photomultiplier comprising:

first circuit means including a first potentiometer coupled to said power supply circuit to control the magnitude of the voltage developed by said power supply;

second circuit means connecting said power supply to said photomultiplier tube;

second potentiometer coupled between said second circuit means at least one of said photomultiplier tube dynodes for controlling the gain of said photomultiplier;

a first and a second motor coupled to drive said first and second potentiometers respectively;

switching means including a timing circuit for controlling the switch sequence of said switching means;

means for starting said timing circuit;

digital readout means;

a third motor coupled to drive said digital readout;

feedback means coupled to said third motor for developing a feedback signal that is a function of the indication of the digital readout means;

a source for generating a reference signal;

third circuit means coupling said source means to said switching circuit;

fourth circuit means coupling said third motor and said feedback means to said switching means for energization of said third motor while said switching means is in a first position for providing a digital readout that is proportional to the intensity of the radiation received by said photomultiplier tube;

a pair of limit switches coupled to said second potentiometer;

fifth circuit means coupling said pair of limit switches to said first motor to apply power to said first motor to drive said motor in a direction determined by which of said limit switches are actuated, and sixth circuit means coupling said second motor and said source of reference potential to said switching means for the energization of said second motor means to the exclusion of the third motor means while said switching means is in a second position for a time duration sufficient for said first and second motors to cooperate to control the gain of said photomultiplier as a function of the intensity of said reference beam of radiation applied to said photomultiplier and said reference potential.

11. A calibration control system as defined in claim 10 including:

seventh circuit means coupling said limit switches to said switching means so that said switching means remains in said second position and the timing cycle of said timing circuit does not while at least one of said pair of limit switches are actuated.

12. In a photoelectric system including an electron multiplier phototube having a cathode, an anode, and a plurality of dynodes, a voltage supply for said dynodes and cathode and an output anode circuit, the provision of means arranged to automatically correct for changes in effective amplification of the phototube, said means comprising:

means for supplying light to the phototube;

an inverse feedback adjustment means, having a predetermined range of adjustment, responsive to the output anode current of the phototube and arranged to modify the effective amplification of the phototube by controlling the magnitude of voltage supplied to at least one of said phototube dynodes;

adjustment means responsive to said inverse feedback adjustment means when said predetermined range of adjustment is exceeded and arranged to modify the effective amplification of said phototube by controlling the magnitude of voltage supplied to said cathode and a plurality of said phototube dynodes;

means for rendering the feedback adjustment means and said adjustment means effective for periods of short duration, and means for applying light input to the phototube at a constant value expected to produce an output anode circuit current of selected value during said periods so that said inverse feedback adjustment means and said adjustment means are adjusted to cooperate in varying the potential applied to said phototube in accordance with the deviation of the output anode current obtained during said period from the output anode current of a selected value.

References Cited

UNITED STATES PATENTS 3,329,821   7/1967   Lesage _____ 250—206

RALPH G. NILSON, *Primary Examiner.*

M. A. LEAVITT, *Assistant Examiner.*